United States Patent
Baggi et al.

(10) Patent No.: US 11,564,780 B2
(45) Date of Patent: Jan. 31, 2023

(54) DENTAL PROSTHETIC DEVICE AND CORRESPONDING INTERMEDIATE CONNECTION COMPONENT

(71) Applicant: ADVAN S.R.L., Amaro (IT)

(72) Inventors: Luigi Baggi, Cassino (IT); Mauro Cavenago, Gorgonzola (IT)

(73) Assignee: ADVAN S.R.L., Amaro (IT)

( * ) Notice: Subject to any disclaimer, the term of this patent is extended or adjusted under 35 U.S.C. 154(b) by 390 days.

(21) Appl. No.: 16/628,804

(22) PCT Filed: Jul. 6, 2018

(86) PCT No.: PCT/IT2018/050124
§ 371 (c)(1),
(2) Date: Jan. 6, 2020

(87) PCT Pub. No.: WO2019/008614
PCT Pub. Date: Jan. 10, 2019

(65) Prior Publication Data
US 2020/0197135 A1 Jun. 25, 2020

(30) Foreign Application Priority Data
Jul. 7, 2017 (IT) .......................... 102017000076961

(51) Int. Cl.
*A61C 8/00* (2006.01)
(52) U.S. Cl.
CPC .......... *A61C 8/0068* (2013.01); *A61C 8/0069* (2013.01); *A61C 8/0074* (2013.01); *A61C 8/0093* (2013.01)

(58) Field of Classification Search
CPC .... A61C 8/0068; A61C 8/0069; A61C 8/0078
USPC ......................................................... 433/173
See application file for complete search history.

(56) References Cited

U.S. PATENT DOCUMENTS

| | | |
|---|---|---|
| 5,030,095 A | 7/1991 | Niznick |
| 5,368,483 A | 11/1994 | Sutter |
| 2013/0295521 A1 * | 11/2013 | Olsson ................ A61C 8/0068 433/173 |
| 2014/0147812 A1 | 5/2014 | Ilter |
| 2016/0206409 A1 | 7/2016 | Kim |

FOREIGN PATENT DOCUMENTS

| | | | |
|---|---|---|---|
| WO | WO-2008138852 A1 * | 11/2008 | ............. A61C 8/005 |
| WO | 2017090037 A1 | 6/2017 | |
| WO | WO-2017090037 A1 * | 6/2017 | ........... A61C 8/0001 |

OTHER PUBLICATIONS

International Search Report for corresponding application PCT/IT2018/050124 filed Jul. 6, 2018; dated Oct. 22, 2018.

* cited by examiner

*Primary Examiner* — Matthew M Nelson
(74) *Attorney, Agent, or Firm* — Cantor Colburn LLP

(57) ABSTRACT

Prosthetic dental device comprising a first axial-symmetric intraosseus component, or implant (11) and a second component, or abutment (12) configured to be connected on one side to the first intraosseus component (11) and to support, on another side, a prosthetic dental component.

11 Claims, 3 Drawing Sheets

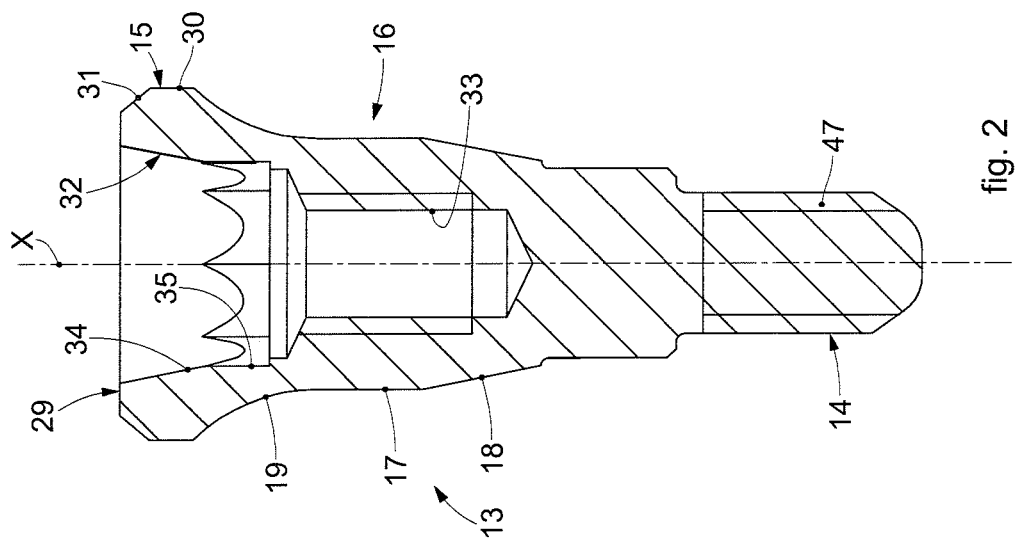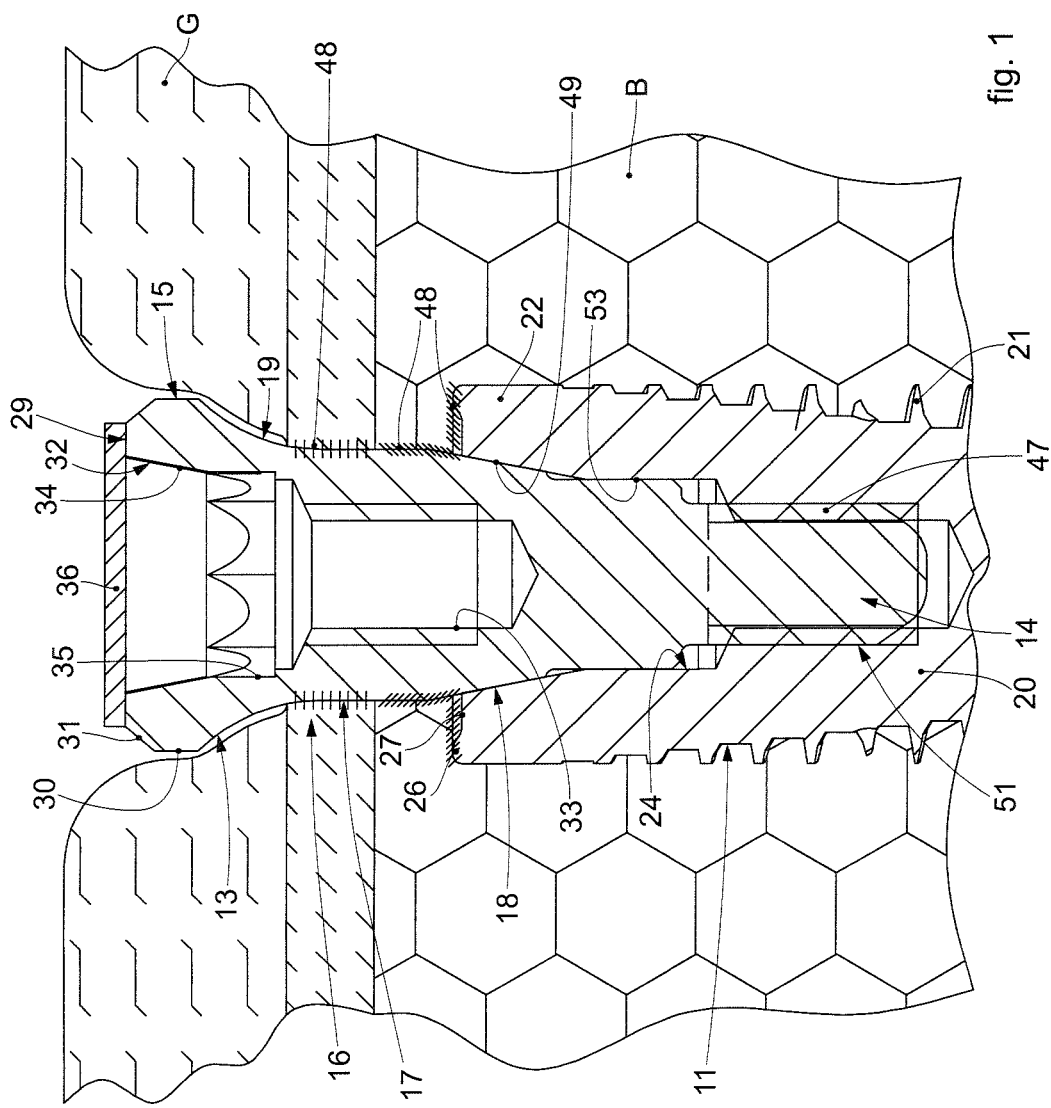

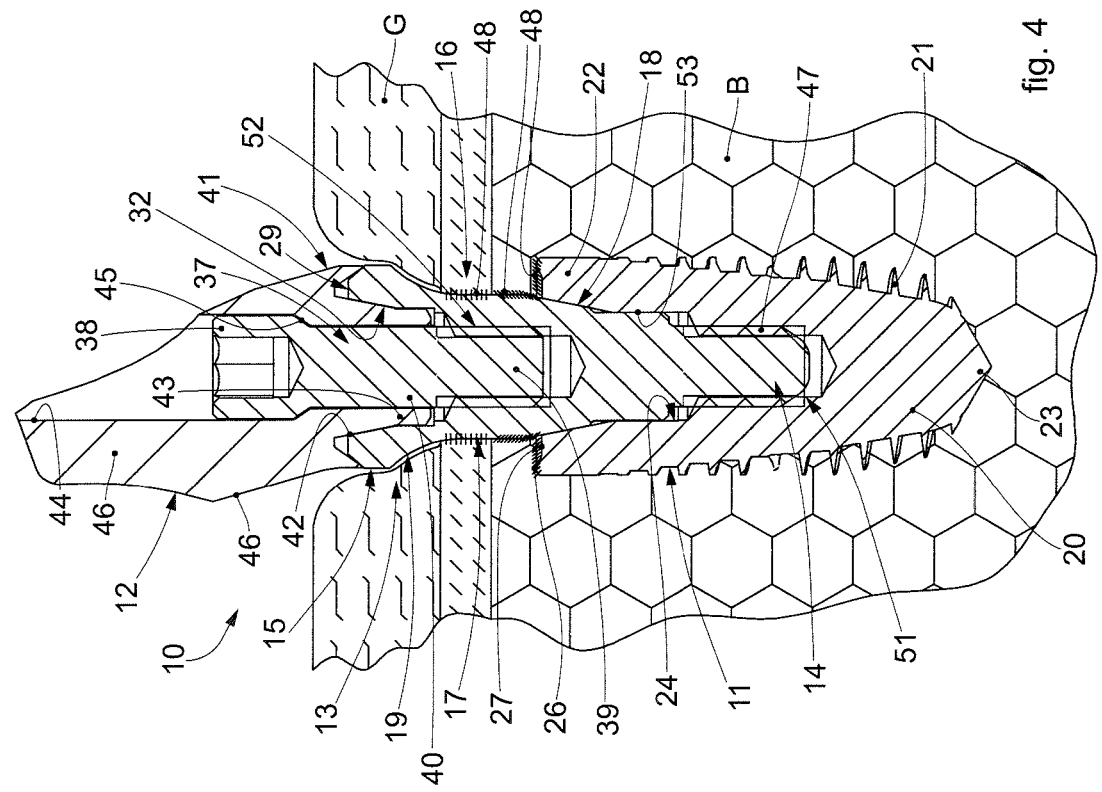
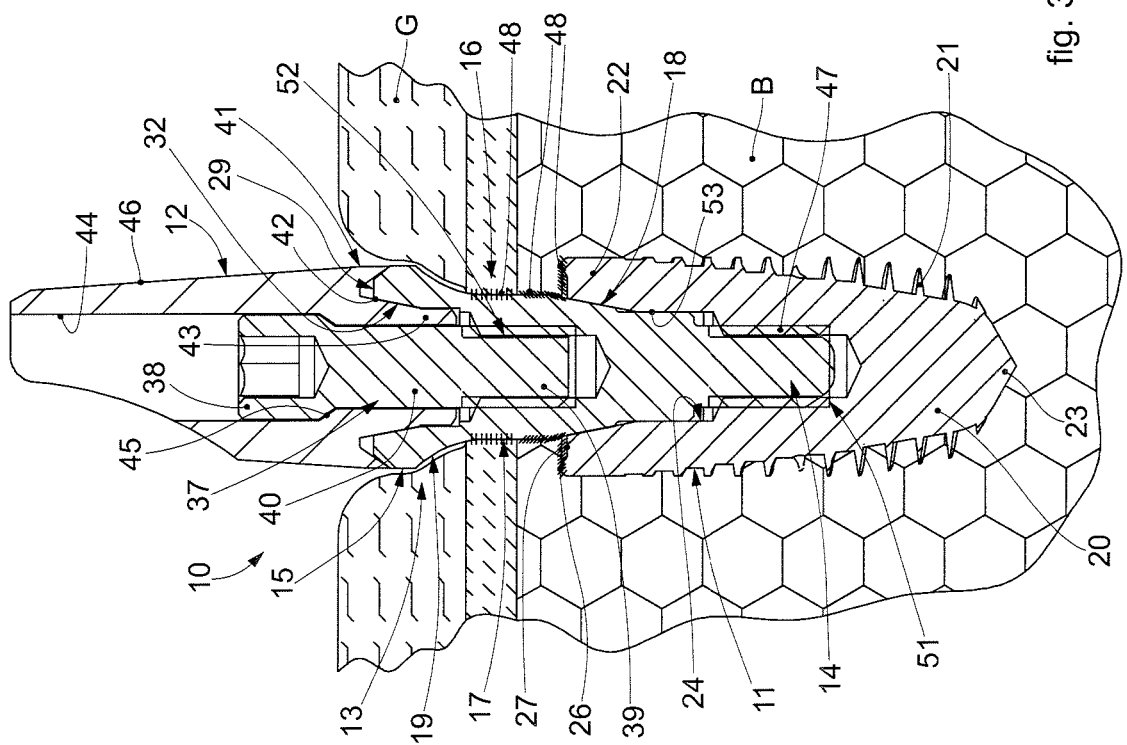

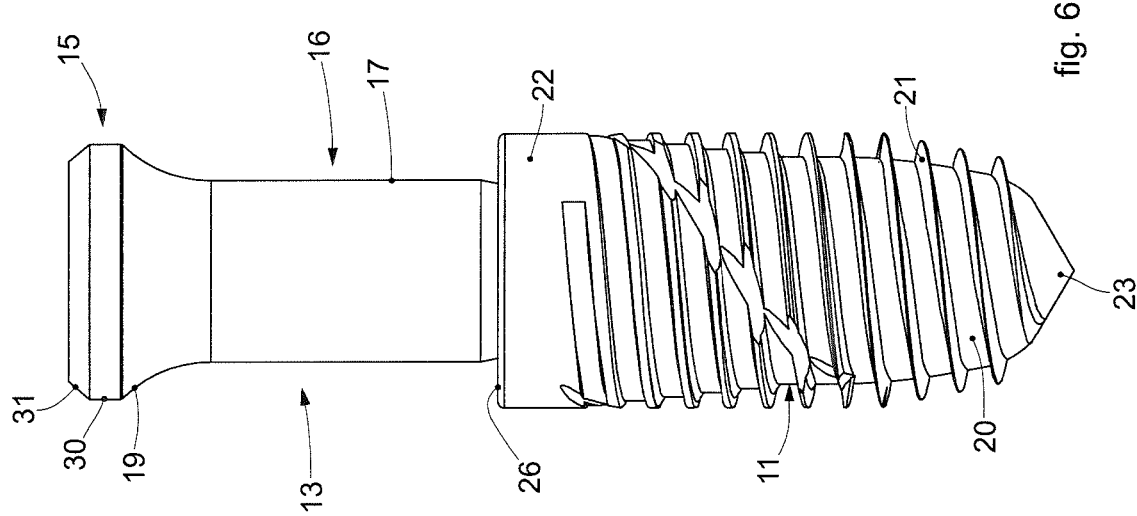
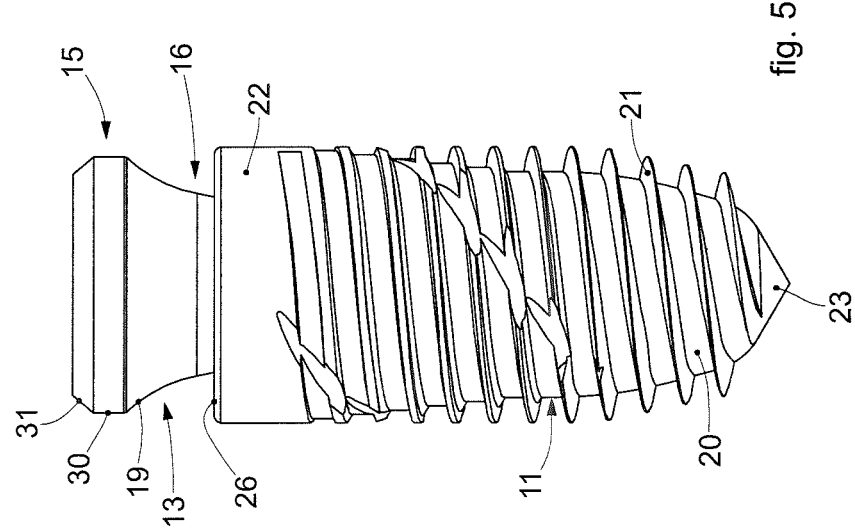

DENTAL PROSTHETIC DEVICE AND CORRESPONDING INTERMEDIATE CONNECTION COMPONENT

FIELD OF THE INVENTION

Embodiments described here concern a dental prosthetic device for dental use.

Embodiments described here also concern an intermediate connection component for said dental prosthetic device, in which the connection component connects two components of the dental prosthetic device with each other, that is, a first component, or intraosseous implant, and a second component, or stump.

BACKGROUND OF THE INVENTION

Dental prosthetic devices are known, comprising a first component, also called an intraosseous implant, a second component, also referred to as a stump or abutment, and possibly a prosthetic component to replace the crown of the tooth.

The above three elements are installed in the patient's mouth on three different levels starting from the bone part, passing through the gingival part and finally in the external part in correspondence with the dental arch.

The first component, or intraosseous implant, normally has the shape of a threaded screw, it is fixed, or anchored, by screwing it into a corresponding hole present, or made, in the bone part, the maxillary or mandibular bone, where the patient's teeth are.

The second component couples with the intraosseous implant at a later stage than the first installation of the first intraosseous component, after a time interval long enough to allow the first intraosseous component to stabilize in the patient's mouth.

The stabilization of the first intraosseous component consists in waiting for osseointegration to occur between the first intraosseous component and the patient's bone part.

It happens that, when the need arises to connect the second component to the first intraosseous component, it is necessary to lacerate the formation of the gingival part, and possibly of the bone part, which has formed above the first intraosseous component, covering it completely. This laceration leads, once again, to the exposure of the bone part to the external environment.

This intervention can cause problems due to poor cleaning of the wound which, for example, can cause infections.

Furthermore, an intervention of this type could cause accidental damage to the previous installation of the first intraosseous component.

It is also known to use second components having a limited height and sufficient to be temporarily covered by the gingival part while waiting to install the dental prosthesis.

However, this type of second component does not allow to adjust the inclination of the dental prosthesis if the need arises, for example if the first intraosseous component has been installed inclined already at the beginning.

Furthermore, with regard to the second components having considerable heights and, therefore, which greatly protrude from the gingival part, if it is necessary to wait an interval of time also for the stabilization of the second component on the level of the gingival part before its complete prosthetization, it is not very aesthetic to see.

It also happens that the second components known in the state of the art do not allow to modify, while the work is in progress, the type of prosthesis to be used.

Examples of dental prosthetic devices are described in US-A-2014/0147812, U.S. Pat. No. 5,030,095, US-A-2016/0206409, U.S. Pat. No. 5,368,483, and KR-A-2016.0072634.

In all these documents, however, a dental prosthetic device is described that comprises an intraosseous implant which is anchored to the patient's bone part and a stump, or "abutment" which is attached in various ways to the intraosseous implant. All these solutions, however, due to the conformation of their components, require that, after the stabilization phase of the implant to the bone part, there is a subsequent intervention on the patient, rather invasive, which is the laceration of the gingival part and sometimes even of a portion of the intraosseous part that has reformed in correspondence with the implant.

Moreover, all the solutions described in these documents provide that the interface zones between the implant and the abutment are completely exposed, during use, toward the outside, with the possibility of infiltration and the onset of possible infections.

One purpose of the present invention is to provide a dental prosthetic implant which facilitates the intervention operations for its installation.

Another purpose of the present invention is to provide a dental prosthetic implant which reduces the probability of the onset of infections.

Another purpose is to provide a dental prosthetic implant that guarantees the success of the intervention.

Another purpose is to provide a dental prosthetic implant which also satisfies aesthetic requirements.

Another purpose is to provide a connection component which guarantees versatility of use also with the work in progress between one intervention and another.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a prosthetic dental device according to the present invention comprises a first axial-symmetric intraosseus component, or implant, in which a first axial cavity is made, open toward the outside, partly threaded and provided with a conical wall.

The prosthetic dental device according to the present invention also comprises a second component, or abutment, configured to be connected on one side to the first intraosseus component and to support, on another side, a prosthetic dental component;

In accordance with one aspect of the present invention, the prosthetic dental device comprises an axial-symmetric intermediate connection component provided with a distal part with a second axial cavity open toward the outside, a proximal part provided externally with a threaded portion that, during use, is screwed into the first axial cavity, and an intermediate part located between the distal part and the proximal part and provided with at least a conical portion, converging toward the proximal part and coupled with conicity to the conical wall.

In accordance with another aspect of the present invention the second axial cavity of the intermediate connection component is provided with a conical part and a threaded part more internal with respect to the conical part, with a diameter of threading equal to that of the threaded portion. The conical portion of the intermediate part has a conicity equal to the conicity of the conical part of the second axial cavity.

Substantially, the intermediate connection component can be considered an extension of a collar of the first intraosseus component.

In fact, the present invention provides that the conformation of the first axial cavity of the first component, or implant, is substantially equal to that of the second axial cavity of the intermediate connection component.

Advantageously, in this way, given that the connection zone of the second component to the intermediate connection component is equal to the connection zone of the first component to the intermediate connection component, it is possible to rapidly change, during the course of the intervention, the implanting process of the prosthetic dental device.

Advantageously, the intermediate connection component allows to rapidly change the implanting process of a prosthetic tooth passing from an initial installation of the first intraosseus component of the juxta type, that is, a first intraosseus component at the level of the bone part, or of the sub-crestal type, that is, a first intraosseus component below the bone part, to a trans-gingival installation. Moreover, in this way, the regeneration of the soft tissue to pre-implant conditions is guaranteed. In fact, the particular conformation of the dental prosthetic device, as defined above, allows to assemble the second component, or abutment, to the implant, in a classic mode in which the first intraosseus component is installed in the juxta configuration, or, in accordance with the present invention, allows to be able to position the same implant below the bone part and to associate with it the intermediate connection component and the second component, or abutment as described above. In this last case, moreover, the interface zone between the first component or implant and the intermediate connection component is positioned completely inside the intraosseus part and is therefore protected from possible infiltrations, contaminations and infections.

Moreover, the intermediate connection component allows to be able to modulate the height of the installation of the second component, moving its terminal end beyond the bone part, for example on the level of the gingival part.

The intermediate connection component can be suitably chosen, even following the osteointegration of the intraosseus implant, as a function of the particular conformation of the transosseous and transmucous zone of the specific patient in whom the device is applied.

It is possible to apply a "One Time Abutment" protocol, without having to use an immediate load approach, which provides the immediate application of the intermediate connection component, since the transmucous path can be prosthesized at a later time without leaving any non-prosthesized components in the patient's mouth.

The intermediate connection component allows to choose at a later time, and possibly change, the prosthetic approach initially chosen, between a cemented and screwed in prosthesis or prosthetic pins, or to change the second component in the course of the intervention, which can be standard or personalized using a graphical processing software, or by melting a calcinable component.

According to another embodiment, the intermediate part is also provided with a central portion having a surface configured to promote the regrowth of gum and/or bone tissue, and with a second portion provided between the central portion and the distal part and having a shape rounded and flared toward the proximal part.

Advantageously, the second portion allows to promote the regeneration of the gingival part avoiding the presence of protruding angles that could weaken the formation of the gingival part.

The present invention also concerns an intermediate connection component for a dental prosthetic device.

The present invention also concerns the combination of a first intraosseus component and an intermediate connection component.

BRIEF DESCRIPTION OF THE DRAWINGS

These and other characteristics of the present invention will become apparent from the following description of some embodiments, given as a non-restrictive example with reference to the attached drawings wherein:

FIG. 1 is a section view of part of a prosthetic dental device according to the present invention;

FIG. 2 is a section view of an intermediate connection component according to the present invention;

FIG. 3 is a section view of the prosthetic dental device according to one embodiment;

FIG. 4 is a section view of the prosthetic dental device according to another embodiment;

FIG. 5 is a front view of the intermediate connection component connected to a first intraosseus component according to one embodiment;

FIG. 6 is a front view of the intermediate connection component connected to the first intraosseus component according to another embodiment.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the various embodiments of the present invention, of which one or more examples are shown in the attached drawing. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Embodiments described here using FIGS. 1-6, concern a dental prosthetic device 10 that comprises a first component, hereafter referred to as an axial-symmetrical intraosseous implant 11 and a second component, hereinafter referred to as the abutment 12.

A first axial cavity 24 is made in the intraosseous implant 11, open toward the outside and at least partly threaded.

The device 10 also comprises an intermediate connection component 13, also axial-symmetric, able to be disposed between the intraosseous implant 11 and the abutment 12.

The intermediate connection component 13 is configured to connect the intraosseous implant 11 and the abutment 12 during use.

In particular, it can be provided that the intermediate connection component 13 is put on the intraosseous implant 11 and connected to the latter with first connection means 51.

The abutment 12 is instead put on the intermediate connection component 13 and is connected to the latter by second connection means 52.

The intraosseous implant 11 and the abutment 12 are therefore not in contact with each other. The intermediate connection component 13, in fact, separates and distances the intraosseous implant 11 from the abutment 12 by a predetermined distance The first connection means 51 and the second connection means 52 are separated and independent of each other in order to allow the selective removal/installation of the intermediate connection component 13 and/or of the abutment 12 independently of each other.

The intermediate connection component 13 develops axially around a central axis X (FIG. 2).

The intermediate connection component 13 comprises a distal part 15 in which a second axial cavity 32 is made, open toward the outside. The abutment 12 is connected with the second connection means 52 in the second axial cavity 32.

The second axial cavity 32 is provided with a conical part 34 and a threaded part 33, more internal than the conical part 34.

For example, the conical part 34 can have an angle, which defines its conicity, comprised between about 10° and about 25°.

The intermediate connection component 13 also comprises a proximal part 14 connected by the first connection means 51 to the intraosseous implant 11.

The proximal part 14 can be provided externally with a threaded portion 47.

According to one embodiment, the threaded portion 33 of the second axial cavity 32 and the threaded portion 47 of the proximal part 14 have identical diameters of the threading.

The proximal part 14 can also be provided with an intermediate part 16 located between the distal part 15 and the proximal part 14.

The intermediate part 16 is provided with at least a conical portion 18, converging toward the proximal part 14.

According to another embodiment of the invention, the conical portion 18 of the intermediate part 16 has a conicity equal to the conicity of the conical part 34 of the second axial cavity 32.

According to another embodiment, the second axial cavity 32 is also provided with a connection part 35 interposed between the threaded part 33 and the conical part 34.

For example, the connection part 35 can have a polygonal cross-section shape. In this way, through the conical part 34 it is possible to insert into the connection part 35 a tool to exert a screwing force which allows to attach the intermediate connection component 13 to the intraosseous implant 11.

According to one embodiment, the intermediate part 16 is also provided with a central portion 17 having a surface configured to promote the regrowth of gingival and/or bone tissue.

According to one embodiment, at least the central portion 17 and the conical portion 18 have an osteoconductive layer 48 at least partly on their most external surface.

The osteoconductive layer 48 advantageously promotes the formation of the bone part B and of the gingival part G on the lateral walls of the device 10. In this way, it is possible to manage with greater certainty where the gingival connective attachment will be positioned after the healing phase.

The osteoconductive layer 48 can be obtained by a surface treatment, for example by means of sanding treatment, plasma spray treatment, or a porous metal coating and possibly a hydroxyapatite coating, or the presence of a trabecular structure. For example, the osteoconductive layer 48 can extend for a segment comprised from about 0.5 mm to about 3 mm.

The central portion 17 of the intermediate part 16 can have a substantially cylindrical shape.

The intermediate part 16 of the intermediate connection component 13 can also be provided with a second portion 19 provided between the central portion 17 and the distal part 15 and having a rounded shape, flared toward the proximal part 14.

According to a preferred embodiment, a lateral wall of the second flared portion 19 can be defined, for example, by the rotation of a curve around the central axis X. The curve can be a branch of a parabola, a hyperbola, or another conical curve.

According to one embodiment, the lateral wall of the second portion 19 has an inclination varying from 30° to 60°, in which this variability is defined by its flared and rounded form.

The distal part 15 of the intermediate connection component 13 has a base surface 29 which substantially determines a platform of the intermediate connection component 13.

The second axial cavity 32 is made in the base surface 29.

According to another embodiment, a beveled portion 31 is made in the base surface 29, which widens toward the inside of the intermediate connection component 13, and a cylindrical portion 30 which connects to the second portion 19.

The cylindrical portion 30 develops parallel to the central axis X of the intermediate connection component 13.

In this way, advantageously, the combination of the cylindrical portion 30 and the beveled portion 31 defines a geometric coupling between the intermediate connection component 13 and the abutment 12.

Furthermore, if the intermediate connection component 13 is only coupled with the intraosseous implant 11, the combination of the cylindrical portion 30 and the beveled portion 31 promotes the regeneration of the gingival part G thereon.

The intermediate connection component 13 can comprise a closing element 36 configured to position itself and to fit, during use, at least in the conical part 34 of the second axial cavity 32.

Advantageously, the closing element 36 allows to cover the second axial cavity 32 while waiting for the stabilization of the assembly formed by the intermediate connection component 13 connected to the intraosseous implant 11. Furthermore, the closing element 36 allows to provide a base for the formation of the gingival part G on it.

The intraosseous implant 11 has a longitudinal development substantially shaped like a truncated cone The intraosseous implant 11 comprises a stem 20 and a threading 21 which develops at least on a portion of the stem 20. The stem 20 has a collar 22 and a pointed terminal end 23 disposed opposite the collar 22.

The intraosseous implant 11 is configured to be installed, or implanted, in a bone part B of a patient after a suitable seating has been made for its installation.

The threaded portion 47 of the proximal part 14 of the intermediate connection component 13 is screwed into the first axial cavity 24, open toward the outside and at least partly threaded.

In this way, the threaded portion 47 and the first axial cavity 24 define the first connection means 51.

In accordance with some solutions, the first axial cavity 24 is provided with a conical wall 49 coupled with conicity to the conical portion 18 of the intermediate connection component 13.

Furthermore, according to a possible solution, the first axial cavity 24 comprises a cylindrical zone 53, located internally with respect to the conical wall 49 and in correspondence with which a coordinated cylindrical zone of the proximal part 14 of the intermediate connection component 13 is positioned. The cylindrical zone of the intermediate connection component 13 has the function of increasing the resistance of the latter and allows to correctly center and position axially the intermediate connection component 13 and the intraosseous implant 11.

In accordance with another solution, the first axial cavity 24 comprises a threaded zone, located more internally with respect to the conical wall 49 and possibly, if present, to the cylindrical zone, and into which the threaded portion 47 of the proximal part 14 is screwed.

According to one embodiment, the collar 22 is provided with an end surface 26 which is substantially flat and is disposed orthogonal to the longitudinal development of the intraosseous implant 11. In the end surface 26 an annular recess 27 is made, located recessed in the thickness of the stem 20. The annular recess 27 promotes the formation of the bone part B and the stabilization of the intraosseous implant 11.

The first axial cavity 24 is made in the end surface 26.

According to one embodiment, when connected to the intraosseous implant 11, the intermediate connection component 13 can have a height, starting from the annular recess 27 of the intraosseous implant 11, which can be comprised between 2 mm and 6.5 mm.

According to another embodiment, the osteoconductive layer 48 is also present on the end surface 26 which, in a connected condition of the intraosseous implant 11 and the intermediate connection component 13, determines a substantially continuous osteoconductive layer 48 with the external surface of the conical portion 18. In this way, the osteoconductive layer 48 defines the availability of a surface which further promotes the regrowth of the bone part B and its bonding with the intraosseous implant 11.

The abutment 12 is also provided with an internal wall 43 coupled with conicity to the conical part 34 of the second axial cavity 32 of the intermediate connection component 13.

The abutment 12 is also provided with a through cavity 44 in which a clamping screw 37 is inserted, screwed into the threaded part 33 of the second axial cavity 32 of the intermediate connection component 13.

The clamping screw 37 and the threaded portion 33 define the second connection means 52.

Moreover, the through cavity 44 can be provided with a conical shoulder 45 on which the head of the clamping screw 37 is positioned resting. In this way, the clamping screw 37, interfering with the conical shoulder 45 as it is gradually screwed to the inter mediate connection component 13, thrusts the abutment 12 against the intermediate connection component 13.

The abutment 12 has a lateral surface 46 which, in the assembled condition of the abutment 12 with the intermediate connection component 13, defines a substantially continuous surface together with the lateral wall of the second portion 19.

Advantageously, the lack of discontinuities and edges promotes the regeneration of the gingival part G.

According to one embodiment, the second axial cavity 32 is configured to accommodate the clamping screw 37. The clamping screw 37 allows to connect and close pack-wise the intermediate connection component 13 and the abutment 12. The clamping screw 37 has a head 38, a threaded lower part 39 and an intermediate part 40 which connects the head 38 to the lower part 39.

The lower part 39 is configured to be screwed in correspondence with the threaded portion 33 of the second axial cavity 32 of the intermediate connection component 13.

The abutment 12 is provided with a connection part 41 having an annular groove 42 suitable to define a same-shape coupling with the cylindrical portion 30 and the beveled portion 31 of the intermediate connection component 13.

The internal wall 43 can be provided as a continuation of a more internal edge of the annular groove 42.

The presence of the intermediate connection component 13 allows to connect abutments 12 having different characteristics of shape, to subsequently dispose the prosthesis.

According to embodiments described here, the abutment 12 can be configured to adapt to a prosthetic dental component coaxial with respect to the central axis X (FIG. 3), or to adapt to a prosthetic dental component inclined with respect to the central axis X (FIG. 4). For example, it can happen that, due to requirements of space, the intraosseous implant 11 cannot be installed in a position not aligned with the installation axis of the dental prosthesis, or because of the particular conformation of the tooth that the dental prosthesis is to replace.

It is clear that modifications and/or additions of parts can be made to the device 10 and the intermediate connection component 13 as described heretofore, without departing from the field and scope of the present invention.

It is also clear that, although the present invention has been described with reference to some specific examples, a person of skill in the art shall certainly be able to achieve many other equivalent forms of device 10 and intermediate connection component 13, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. Prosthetic dental device comprising:
a first axial-symmetric intraosseus component, or implant, in which a first axial cavity is made, open toward the outside, partly threaded and provided with a conical wall;
a second component, or abutment configured to be connected on one side to said first intraosseus component or said implant and to support, on another side, a prosthetic dental component;
an axial-symmetric intermediate connection component provided with a distal part with a second axial cavity open toward the outside, a proximal part provided externally with a threaded portion that, during use, is screwed into said first axial cavity, and an intermediate part located between said distal part and said proximal part and provided with at least a conical portion, converging toward said proximal part and coupled with conicity to said conical wall, wherein said second axial cavity of said intermediate connection component is provided with a conical part and a threaded part more internal with respect to the conical part, with a diameter of the threading equal to that of said threaded portion, and wherein said conical portion of said intermediate part has a conicity equal to the conicity of said conical part of said axial cavity.

2. Device according to claim 1, wherein said first axial cavity comprises a cylindrical zone, located internally with respect to the conical wall and in correspondence with which a coordinated cylindrical zone of the proximal part of the intermediate connection component is positioned.

3. Device according to claim 1, wherein the conical part has an angle, which defines its conicity, comprised between about 10° and 25°.

4. Device according to claim 1, wherein said second component or said abutment is provided with an internal wall coupled with conicity to said conical part, and with a through cavity in which a clamping screw is inserted, screwed into said threaded part, in order to connect said second component or said abutment and said intermediate connection component with respect to each other.

5. Device according to claim 1, wherein the second axial cavity is also provided with a connection part interposed between the threaded part and the conical part, and in that the connection part has a polygonal cross section shape.

6. Device according to claim 1, wherein said first component or said implant comprises a stem and a threading that develops at least on one portion of the stem, wherein said stem has a collar and a pointed terminal end opposite the collar.

7. Device according to claim 6, wherein said collar is provided with an end surface that is substantially flat and is disposed orthogonal to the longitudinal development of the first component or said implant, and in that an annular recess is made in the end surface, located recessed in the thickness of the stem.

8. Device according to claim 1, wherein said intermediate part is also provided with a central portion with a surface configured to promote the regrowth of gum and/or bone tissue, and with a second portion provided between said central portion and said distal part and having a shape rounded and flared toward said proximal part.

9. Device according to claim 8, wherein at least said central portion and said conical portion have an osteoconductive layer at least partly on their more external surface.

10. Axial-symmetric intermediate connection component for a prosthetic dental device comprising a first axial-symmetric intraosseus component or implant, a second component, or abutment configured to be connected on one side to said first intraosseus component or said implant and to support, on another side, a prosthetic dental component, a distal part with a second axial cavity open toward the outside, a proximal part provided externally with a threaded portion able to be screwed, during use, to said first intraosseus component or said implant, and an intermediate part located between said distal part and said proximal part and provided with at least a conical portion, converging toward said proximal part and coupled with conicity in a first axial cavity of said first intraosseus component or said implant, wherein said second axial cavity is provided with a conical part and a threaded part more internal with respect to the conical part, with a diameter of the threading equal to that of said threaded portion, and wherein said conical portion of said intermediate part has a conicity equal to the conicity of said conical part of said second axial cavity.

11. Combination, comprising:

a first axial-symmetric intraosseus component, or implant, and an axial-symmetric intermediate connection component, and a first axial cavity being made in said first axial-symmetric intraosseus component or said implant, open toward the outside, partly threaded and provided with a conical wall;

wherein said intermediate connection portion being provided with a distal part with a second axial cavity open toward the outside, a proximal part provided externally with a threaded portion that, during use, is screwed into said first axial cavity, and an intermediate part located between said distal part and said proximal part and provided with at least a conical portion, converging toward said proximal part and coupled with conicity to said conical wall, wherein said second axial cavity of said intermediate connection component is provided with a conical part and a threaded part more internal with respect to the conical part, with a diameter of the threading equal to that of said threaded portion, and wherein said conical portion of said intermediate part has a conicity equal to the conicity of said conical part of said axial cavity.

* * * * *